(12) United States Patent
Kisara et al.

(10) Patent No.: US 8,599,445 B2
(45) Date of Patent: Dec. 3, 2013

(54) IMAGE SENSOR UNIT AND IMAGE READING APPARATUS USING THE SAME

(75) Inventors: Mitsuyoshi Kisara, Saitama (JP); Hideo Kiyota, Saitama (JP); Shuuichi Shimoda, Saitama (JP); Hidemasa Yoshida, Saitama (JP); Hidehisa Takahashi, Saitama (JP)

(73) Assignee: Canon Components, Inc. (JP)

( * ) Notice: Subject to any disclaimer, the term of this patent is extended or adjusted under 35 U.S.C. 154(b) by 54 days.

(21) Appl. No.: 13/328,553

(22) Filed: Dec. 16, 2011

(65) Prior Publication Data

US 2012/0154877 A1 Jun. 21, 2012

(30) Foreign Application Priority Data

Dec. 17, 2010 (JP) ................... 2010-282128

(51) Int. Cl.
*H04N 1/04* (2006.01)
(52) U.S. Cl.
USPC ............ 358/474; 358/486; 358/475; 358/496
(58) Field of Classification Search
USPC .................. 358/474, 486, 475, 496, 497, 498
See application file for complete search history.

(56) References Cited

U.S. PATENT DOCUMENTS

| | | | |
|---|---|---|---|
| 5,182,445 A * | 1/1993 | Yamashita | 250/208.1 |
| 5,864,408 A | 1/1999 | Kumashiro | |
| 7,284,891 B2 | 10/2007 | Saito | |
| 7,722,223 B2 | 5/2010 | Saito et al. | |
| 7,859,726 B2 | 12/2010 | Endo et al. | |
| 2006/0008295 A1 * | 1/2006 | Kohchi et al. | 399/144 |
| 2006/0152942 A1 | 7/2006 | Saito et al. | |
| 2007/0285740 A1 | 12/2007 | Onishi et al. | |
| 2008/0068682 A1 | 3/2008 | Morikawa | |
| 2008/0112017 A1 | 5/2008 | Nagasaka | |
| 2009/0003000 A1 | 1/2009 | Saito et al. | |

(Continued)

FOREIGN PATENT DOCUMENTS

| EP | 0 844 784 A2 | 11/1997 |
|---|---|---|
| EP | 1 049 055 A2 | 4/2000 |

(Continued)

OTHER PUBLICATIONS

Extended European Search Report for EP 11194502.8, mail date Dec. 4, 2012. Cited in related U.S. Appl. No. 13/333,751.

(Continued)

*Primary Examiner* — Houshang Safaipour
(74) *Attorney, Agent, or Firm* — Rossi, Kimms & McDowell LLP (57) ABSTRACT

An image sensor unit includes: a light source including a light emitting element on a light emitting surface; a light guide that causes light from the light source to be incident on a light incident surface facing to the light emitting surface, ejects the light from a light ejecting surface and illuminates a document; a rod lens array that images reflected light from the document; a sensor substrate on which a photoelectric conversion element is mounted, the photoelectric conversion element converting the reflected light imaged by the rod lens array into an electric signal; and a frame that supports the light source, the light guide, the rod lens array and the sensor substrate, wherein positioning sections are provided on an opposite side of the light emitting surface of the light source and at a part of the frame which is disposed at the opposite side of the light emitting surface.

6 Claims, 11 Drawing Sheets

(56) References Cited

U.S. PATENT DOCUMENTS

| | | |
|---|---|---|
| 2009/0294630 A1 | 12/2009 | Saito et al. |
| 2012/0287484 A1 | 11/2012 | Shimoda et al. |
| 2013/0009037 A1 | 1/2013 | Takahashi |
| 2013/0038912 A1 | 2/2013 | Horiguchi et al. |
| 2013/0038913 A1 | 2/2013 | Shimoda et al. |
| 2013/0038914 A1 | 2/2013 | Yoshida et al. |

FOREIGN PATENT DOCUMENTS

| | | |
|---|---|---|
| EP | 1 471 472 A2 | 4/2004 |
| EP | 2 246 825 A1 | 4/2009 |
| JP | 8-223417 A | 8/1996 |
| JP | 09-214675 A | 8/1997 |
| JP | 10-285330 A | 10/1998 |
| JP | 2001-005122 A | 1/2001 |
| JP | 2003-037717 A | 2/2003 |
| JP | 2003-046726 A | 2/2003 |
| JP | 2003-281913 A | 10/2003 |
| JP | 2004146870 A | 5/2004 |
| JP | 2005-223424 A | 8/2005 |
| JP | 2006-311232 A | 11/2006 |
| JP | 3885088 B2 | 11/2006 |
| JP | 2007-116590 A | 5/2007 |
| JP | 2007-194797 A | 8/2007 |
| JP | 2007-300536 A | 11/2007 |
| JP | 2008-42425 A | 2/2008 |
| JP | 2008-112301 A | 5/2008 |
| JP | 2009-086488 A | 4/2009 |
| JP | 2010-136061 A | 6/2010 |
| JP | 2011-124741 A | 6/2011 |
| WO | 2006/137263 A1 | 12/2006 |
| WO | 2007/077760 A1 | 7/2007 |
| WO | 2008/013234 A1 | 1/2008 |

OTHER PUBLICATIONS

Japanese Office Action for JP 2011-236415, mail date Nov. 13, 2012. Cited in related U.S. Appl. No. 13/333,751.

Japanese Office Action for JP 2012-247653, mail date Dec. 11, 2012. Cited in related U.S. Appl. No. 13/333,751.

International Search Report for PCT/JP2010/069500, mail date Nov. 30, 2010. Cited in U.S. Appl. No. 13/519,353.

Specification and drawings for related co-pending U.S. Appl. No. 13/315,747, filed Dec. 9, 2011.

Specification and drawings for related co-pending U.S. Appl. No. 13/338,418, filed Dec. 28, 2011.

Specification and drawings for related co-pending U.S. Appl. No. 13/333,751, filed Dec. 21, 2011.

Office Action issued in Corresponding Japanese Patent Application No. 2010-282128 dated Nov. 6, 2012.

* cited by examiner

000
IMAGE SENSOR UNIT AND IMAGE READING APPARATUS USING THE SAME

CROSS-REFERENCE TO RELATED APPLICATIONS

This application is based upon and claims the benefit of priority of the prior Japanese Patent Application No. 2010-282128, filed on Dec. 17, 2010, the entire contents of which are incorporated herein by reference.

BACKGROUND OF THE INVENTION

1. Field of the Invention

The present invention relates to an image sensor unit and an image reading apparatus using the same. In particular, the present invention relates to an image sensor unit capable of accurately positioning a light source with respect to a light guide and an image reading apparatus using the same.

2. Description of the Related Art

Typically, copiers, image scanners and facsimiles are known as image reading apparatuses. These image reading apparatuses employ a contact image sensor unit (CIS: Contact Image Sensor) capable of optically reading image information of a document and converting the information into an electric signal. The contact image sensor unit includes an LED module having a light emitting element, such as LED, for illuminating a document, and a light guide that guides light emitted from the LED module and performs linear illumination. Typically, the LED module and the light guide are attached to a frame and are configured into a unit.

The light guide is formed of a transparent member having a length corresponding to the width of a document to be illuminated. In the light guide, a side end surface is a light incident surface on which light from the LED module incidents, and one surface along the longitudinal direction is a light ejecting surface for ejecting incident light. Thus, the light emitting element of the LED module is required to be arranged so as to be faced to the light incident surface of the light guide. However, since the light guide has a narrow shape, the light incident surface is smaller in area than the light ejecting surface. Accordingly, in a contact image sensor unit, it is difficult to accurately dispose the light emitting element of the LED module on the light incident surface of the light guide. If the light incident surface of the light guide and the light emitting element are disposed in a manner deviating from each other, the amount of light emitted from the light emitting element and incident on the light guide decreases, which causes a problem in that a desired illumination intensity for illuminating the document cannot be attained.

Patent Document 1 discloses a line illuminating device in which three pins for positioning a light emitting element are formed at an end of a light guide casing filled with a light guide or on a side end surface of the light guide and three holes into which the respective pins are inserted are formed on the light emitting element. Such a line illuminating device allows the light emitting element to be positioned with respect to the light guide by inserting the pins on the light guide side into the respective holes of the light emitting element.
Patent Document 1
Japanese Laid-Open Patent Publication No. 2004-146870

The line illuminating device of Patent Document 1 is capable of positioning the light emitting element with respect to the light guide. However, in a case of changing the size of the light incident surface of the light guide or changing the mounting angle of the light guide with respect to a frame, the positions of the pins formed on the light guide side are changed. Accordingly, there is a problem in that the positions of holes of the light emitting element and the respective pins on the light guide side do not match with each other and the light emitting element cannot be accurately positioned with respect to the light guide.

In the line illuminating device of Patent Document 1, the three pins on the light guide side should correctly be inserted into the three holes on the light emitting element. This operation is not easy. Accordingly, there is a problem in that assemblage of the image sensor unit requires effort.

SUMMARY OF THE INVENTION

The present invention is made in view of the aforementioned problems. It is an object of the present invention to provide an image sensor unit capable of accurately positioning and easily attaching the light source with respect to the light guide, and an image reading apparatus using the same.

An image sensor unit of the present invention includes: a light source including a light emitting element on a light emitting surface; a light guide that causes light from the light source to be incident on a light incident surface facing to the light emitting surface, ejects the light from a light ejecting surface and illuminates an object to be illuminated; an imaging element imaging reflected light from the illuminated object; a sensor substrate on which a photoelectric conversion element is mounted, the photoelectric conversion element converting the reflected light imaged by the imaging element into an electric signal; and a supporter that supports the light source, the light guide, the imaging element and the sensor substrate, wherein positioning sections are provided on an opposite side of the light emitting surface of the light source and at a part of the supporter where the opposite side of the light emitting surface of the light source is positioned.

An image reading apparatus using an image sensor unit of the present invention includes: a light source including a light emitting element on a light emitting surface; a light guide that causes light from the light source to be incident on a light incident surface facing to the light emitting surface, ejects the light from a light ejecting surface and illuminates an object to be illuminated; an imaging element imaging reflected light from the illuminated object; a sensor substrate on which a photoelectric conversion element is mounted, the photoelectric conversion element converting the reflected light imaged by the imaging element into an electric signal; and a supporter that supports the light source, the light guide, the imaging element and the sensor substrate, wherein positioning sections are provided on an opposite side of the light emitting surface of the light source and at a part of the supporter where the opposite side of the light emitting surface of the light source is positioned.

DETAILED DESCRIPTION OF THE PREFERRED EMBODIMENTS

Preferred embodiments of an image sensor unit and an image reading apparatus using the same according to the present invention will hereinafter be described with reference to drawings. In the drawings, which will be described below, a main scanning direction of the image sensor unit is denoted by an arrow M, and a sub-scanning direction is denoted by an arrow S, as necessary.

Figure 1:
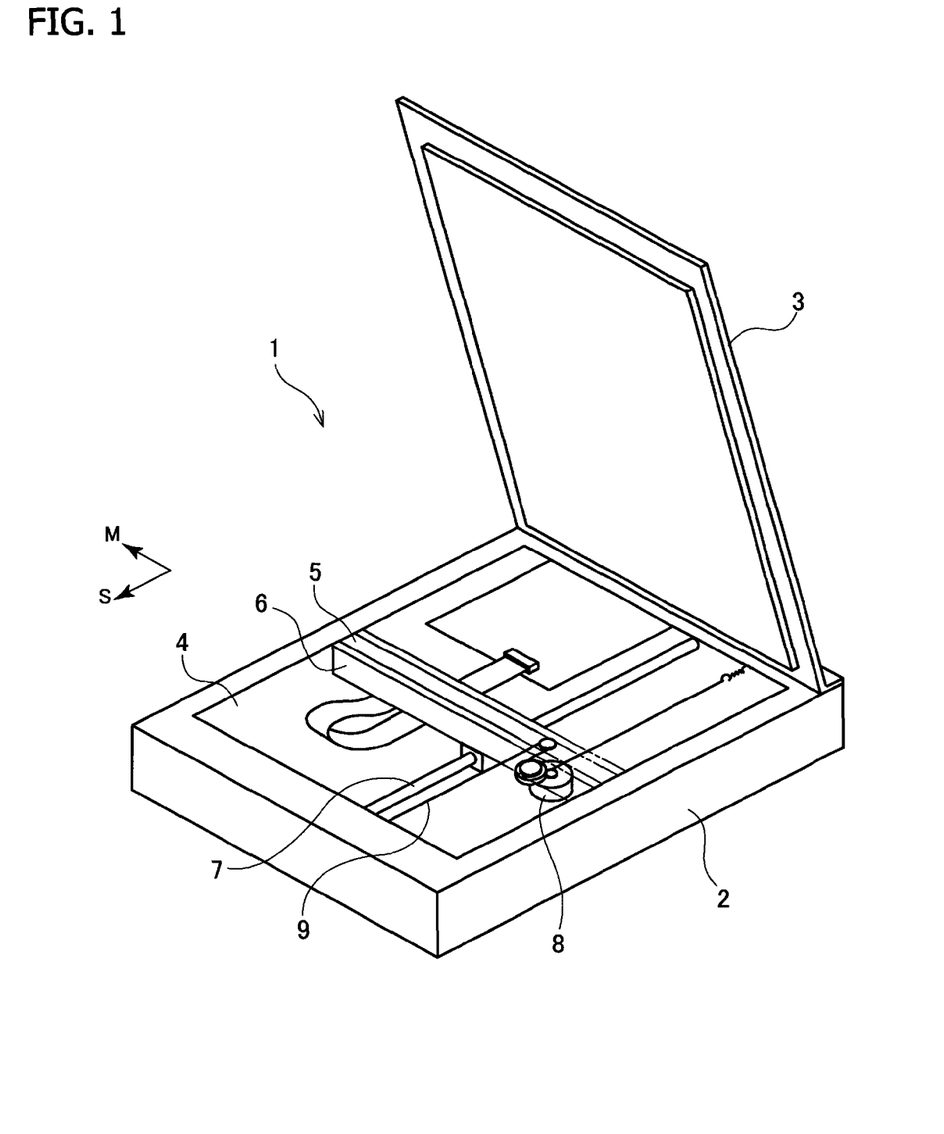
FIG. 1 is a perspective view showing an appearance of an image scanner 1 of this embodiment.

First, a structure of a flatbed image scanner 1 as an image reading apparatus will be described with reference to FIG. 1. FIG. 1 is a perspective view showing an appearance of the flatbed image scanner 1. As shown in FIG. 1, the image scanner 1 includes a casing 2 and a platen cover 3 that is provided in a manner capable of opening and closing with respect to the casing 2 so as to cover a document.

The casing 2 includes a platen glass 4, a contact image sensor unit (hereinafter, referred to as CIS unit 5), a holder 6, a slide shaft 7, a drive motor 8 and a wire 9. The platen glass 4 is a transparent plate made of a glass as a document stage. The CIS unit 5 optically reads image information of the document as an illuminated object placed on the platen glass 4, and converts the information into an electric signal. The detailed configuration of the CIS unit 5 will be described later. The holder 6 holds the CIS unit 5 in a manner surrounding the unit. The CIS unit 5 held by the holder 6 is driven by the drive motor 8 via the wire 9 and moves in a reading direction (sub-scanning direction) along the slide shaft 7.

Figure 2:
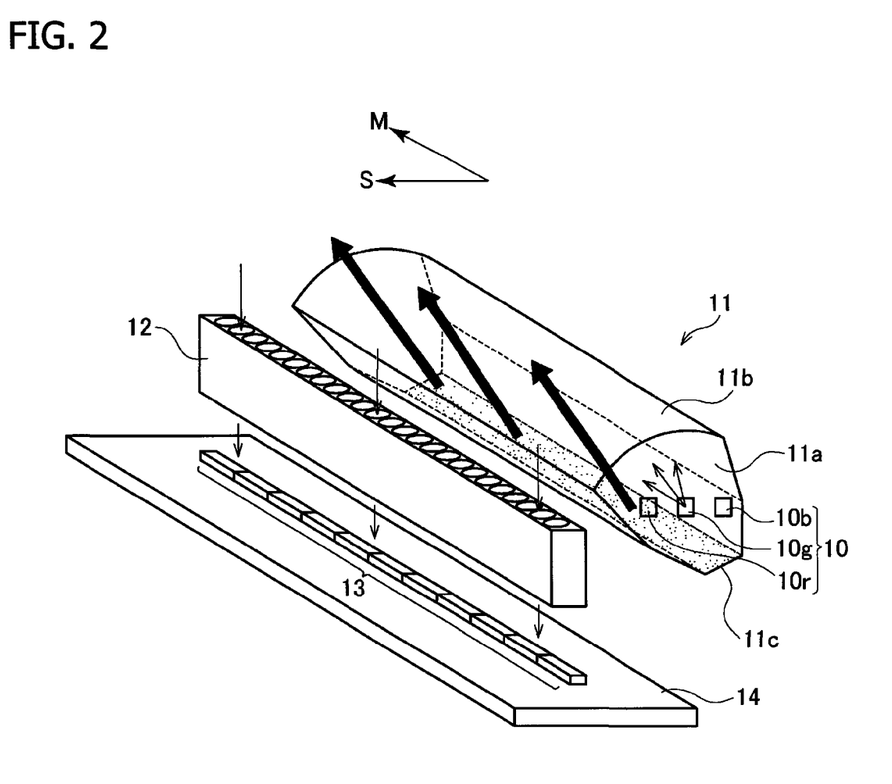
FIG. 2 is a schematic view showing a configuration in a CIS unit 5 of this embodiment.

Next, relationship between configurational elements and an optical path from a light source 10 in the CIS unit 5 will be described with reference to FIG. 2. FIG. 2 is a schematic view showing the configuration in the CIS unit 5. In the CIS unit 5, the light source 10, a light guide 11, a rod lens array 12 and a sensor substrate 14 are arranged.

The light source 10 illuminates the document. The light source 10 includes, for instance, light emitting elements 10r, 10g and 10b having light emitting wavelengths of three colors, or red, green and blue. The light source 10 emits light by sequentially switching the light emitting elements 10r, 10g and 10b.

The light guide 11 guides the light emitted from the light source 10 to the document placed on the platen glass 4. The light guide 11 is formed into a narrow shape having a length corresponding to the width of the document. The light guide 11 is formed of transparent plastic, such as acrylic resin or polycarbonate.

A side end surface on one side of the light guide 11 in the longitudinal direction (main scanning direction) is a light incident surface 11a on which light from the light source 10 is incident. In the CIS unit 5, the light emitting elements 10r, 10g and 10b of the light source 10 are disposed facing to the light incident surface 11a such that the light from the light source 10 is efficiently incident on the light guide 11. A surface of the light guide 11 along the longitudinal direction and facing to the document on the platen glass 4 is a light ejecting surface 11b from which the incident light on the light guide 11 is ejected. A surface facing to the light ejecting surface 11b is a reflecting surface 11c that reflects the light from the light incident surface 11a in the light guide 11.

Accordingly, the light guide 11 scatters the incident light from the light incident surface 11a at the reflecting surface 11c, and ejects the light from the light ejecting surface 11b, thereby illuminating the document. The light source 10 and the light guide 11 thus function as an illuminating device that illuminates the document.

The rod lens array 12 includes a plurality of erect equal magnification imaging elements arranged in a direction identical to the longitudinal direction of the light guide 11. The rod lens array images light reflected from the document on a photoelectric conversion element 13.

The sensor substrate 14 includes a plurality of photoelectric conversion elements 13, which convert the reflected light imaged by the rod lens array 12 into an electric signal, arranged in the direction identical to the longitudinal direction of the light guide 11.

The rod lens array 12 and the photoelectric conversion element 13 are formed into a length corresponding to the width of the document.

When the image scanner 1 including the CIS unit 5 configured as described above reads a document, the image scanner 1 moves the CIS unit 5 to a reading start position of the document. The CIS unit 5 moved to the reading start position sequentially turns on the light emitting elements 10r, 10g and 10b of the light source 10. Light from the light source 10 is incident on the light incident surface 11a of the light guide 11 and subsequently ejected uniformly from the light ejecting surface 11b. The surface of the document is illuminated with the light ejected from the light guide 11 linearly along the main scanning direction. The illuminated light is reflected by the document and subsequently imaged by the rod lens array 12 on the photoelectric conversion element 13 mounted on the sensor substrate 14. The photoelectric conversion element 13 converts the imaged reflected light into an electric signal. The CIS unit 5 converts the reflected light of all the red, green and blue and thus a reading operation on one scan line along the main scanning direction is finished.

Subsequently, the image scanner 1 moves the CIS unit 5 in the sub-scanning direction by as long as one scan line. The CIS unit 5 performs the reading operation on one scan line as described above. Thus, the CIS unit 5 repeats moving by one scan line and the reading operation, thereby allowing the entire document to be read. The image scanner 1 image-processes the electric signal converted by the CIS unit 5 as necessary and stores the signal as image data in a storing unit, and thus the reading of the entire document placed on the platen glass 4 is finished.

The CIS unit 5 configured as described above requires that the light ejected from the light guide 11 has a desired illumination intensity. Thus, in the CIS unit 5, the light source 10 is required to be correctly disposed at a position facing to the light incident surface 11a of the light guide 11. The CIS unit 5 of this embodiment is configured so as to dispose configurational elements of the CIS unit 5 at respective prescribed positions using the frame 20.

A manner of supporting each configurational element of the CIS unit 5 of this embodiment by means of the frame 20 will hereinafter be described below.

First Embodiment

First, configurational elements of a CIS unit 5 of a first embodiment will be described with reference to FIGS. 3 to 5.

Figure 3:
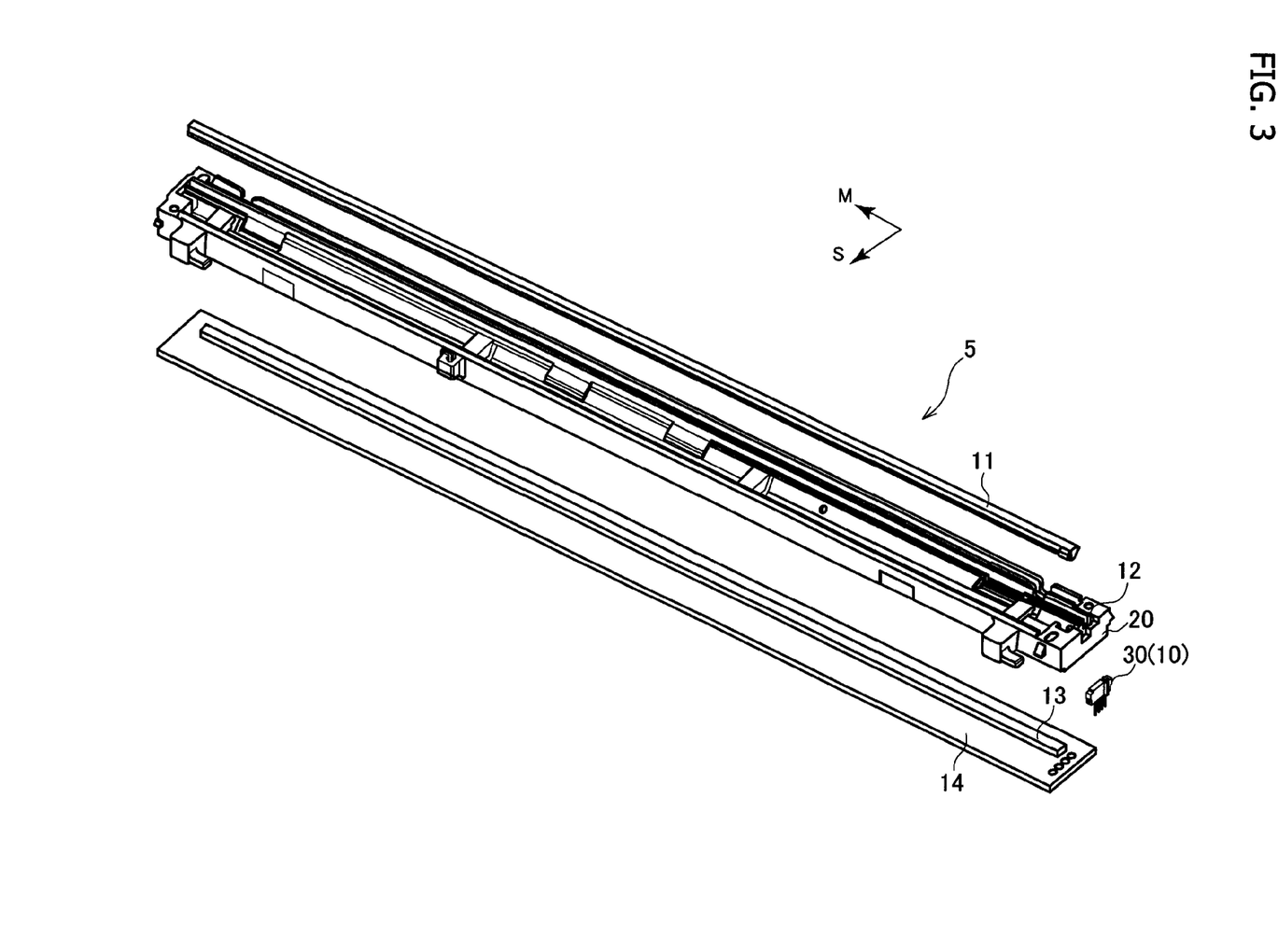
FIG. 3 is an exploded perspective view of the CIS unit 5 of this embodiment.

FIG. 3 is an exploded perspective view of the CIS unit 5. FIG. 4 is an enlarged view of the light source 10 in the perspective view shown in FIG. 3. FIG. 5 is a sectional view of the configurational elements of the CIS unit 5 taken along the sub-scanning direction.

Figure 4:
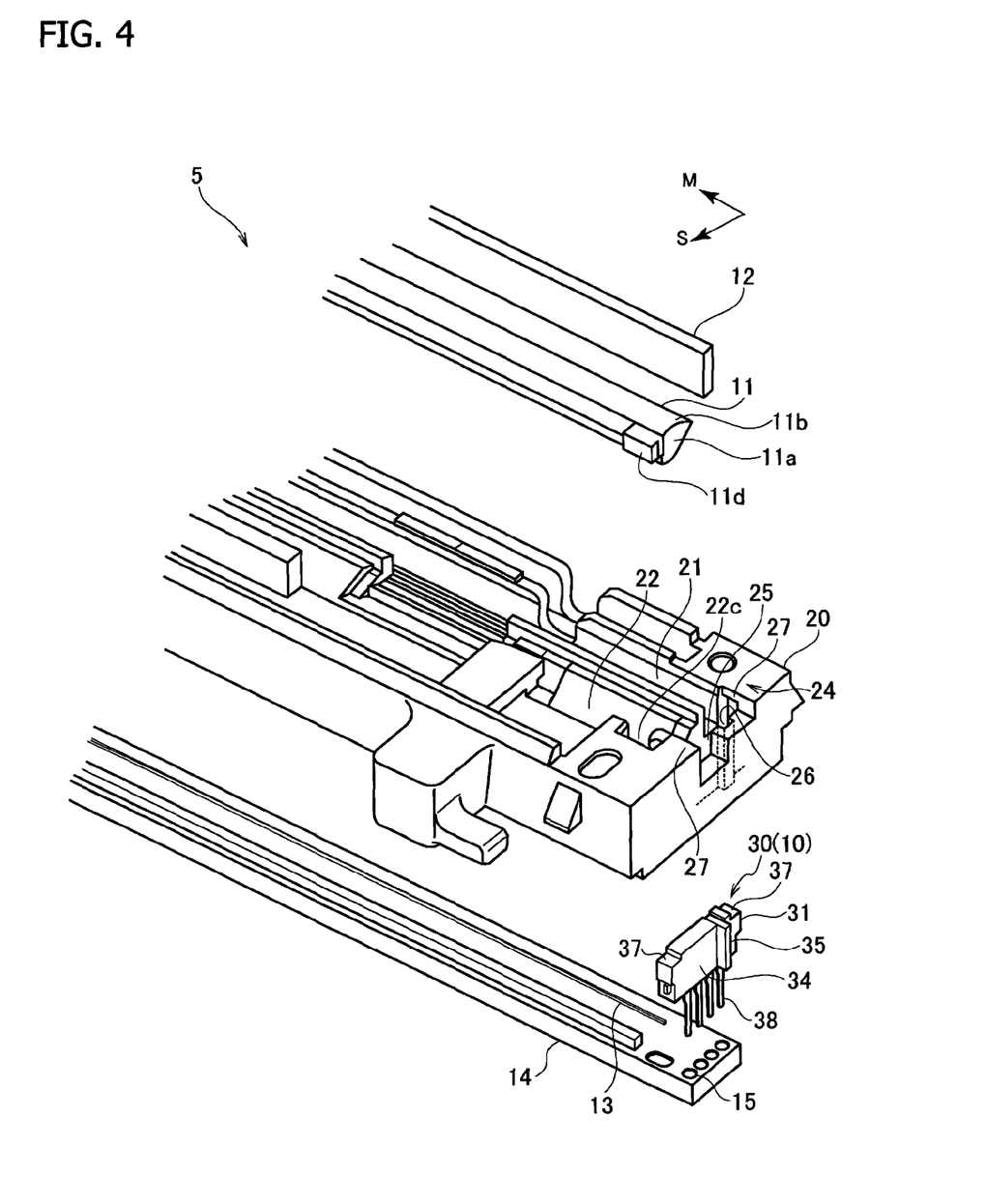
FIG. 4 is an enlarged exploded perspective view of the CIS unit 5 of this embodiment.

As shown in FIGS. 3 and 4, the CIS unit 5 of this embodiment includes a light source 10, a light guide 11, a rod lens array 12, a sensor substrate 14, and a frame 20 as a supporter that supports these elements.

The frame 20 has a substantially rectangle shape viewed in the main scanning direction, and is formed to be elongated along the main scanning direction. The frame 20 is formed to have convex and concave shapes in order to support each configurational element of the CIS unit 5.

Description will be made more specifically. As shown in FIGS. 4 and 5, a lens insertion groove 21 into which the rod lens array 12 is inserted, a light guide supporting groove 22 where the light guide 11 is mounted, a substrate installation part 23 (see FIG. 5) where the sensor substrate 14 is installed, and a light source mount 24 (see FIG. 4) where the light source 10 is mounted, are formed in the frame 20.

The lens insertion groove 21 is formed along the longitudinal direction of the frame 20 in a manner of having an opening at the top of the frame 20. As shown in FIG. 5, the lens insertion groove 21 also has an opening at the bottom to be formed such that reflected light from the document is ejected below through the rod lens array 12 so as to be imaged on the photoelectric conversion element 13.

The light guide supporting groove 22 is formed in parallel to the lens insertion groove 21. As shown in FIG. 5, the light guide supporting groove 22 is formed to have an opening 22a along the longitudinal direction such that the light guide 11 can be inserted from substantially above the frame 20. Above the light guide supporting groove 22, a holding overhang 22b is formed integrally with the frame 20. The holding overhang 22b detachably holds the light guide 11 inserted into the light guide supporting groove 22. FIG. 5 indicates the light guide 11 held in the light guide supporting groove 22 by a chain double-dashed line. As shown in FIG. 5, the light guide supporting groove 22 is formed so as to have a sectional shape substantially identical to a sectional shape of the light guide 11 except for the light ejecting surface 11b. Accordingly, the light guide 11 can be positioned at a prescribed mounting angle. In a state where the light guide 11 is held in the light guide supporting groove 22, the document is illuminated with the light ejected from the light ejecting surface 11b of the light guide 11 at an angle according to the mounting angle (see an arrow A in FIG. 5).

As shown in FIG. 4, a convex longitudinal positioning section 11d is integrally formed with the light guide 11 of this embodiment at an end on a side of the light incident surface 11a of opposite ends in the longitudinal direction. The convex longitudinal positioning section 11d is formed to protrude from a side surface adjacent to the light incident surface 11a in a direction orthogonal to the longitudinal direction of the light guide 11. On the other hand, the light guide supporting groove 22 includes a concave longitudinal positioning section 22c formed to be fitted with the convex longitudinal positioning section 11d, at an end on a side of the light source 10 in the longitudinal direction. Accordingly, the concave longitudinal positioning section 22c is fitted with the convex longitudinal positioning section 11d, thereby allowing the light guide 11 to be positioned with respect to the longitudinal direction of the light guide supporting groove 22. There is a case of expansion and contraction of the light guide 11 in the longitudinal direction due to a thermal effect. Even in this case, the position of the longitudinal positioning section 11d of the light guide 11 does not change but only the end opposite to the light incident surface 11a is deviated in the longitudinal direction. Accordingly, even when the light guide 11 expands and contracts in the longitudinal direction, the position of the light incident surface 11a adjacent to the longitudinal positioning section 11d does not change with respect to the frame 20.

Figure 5:
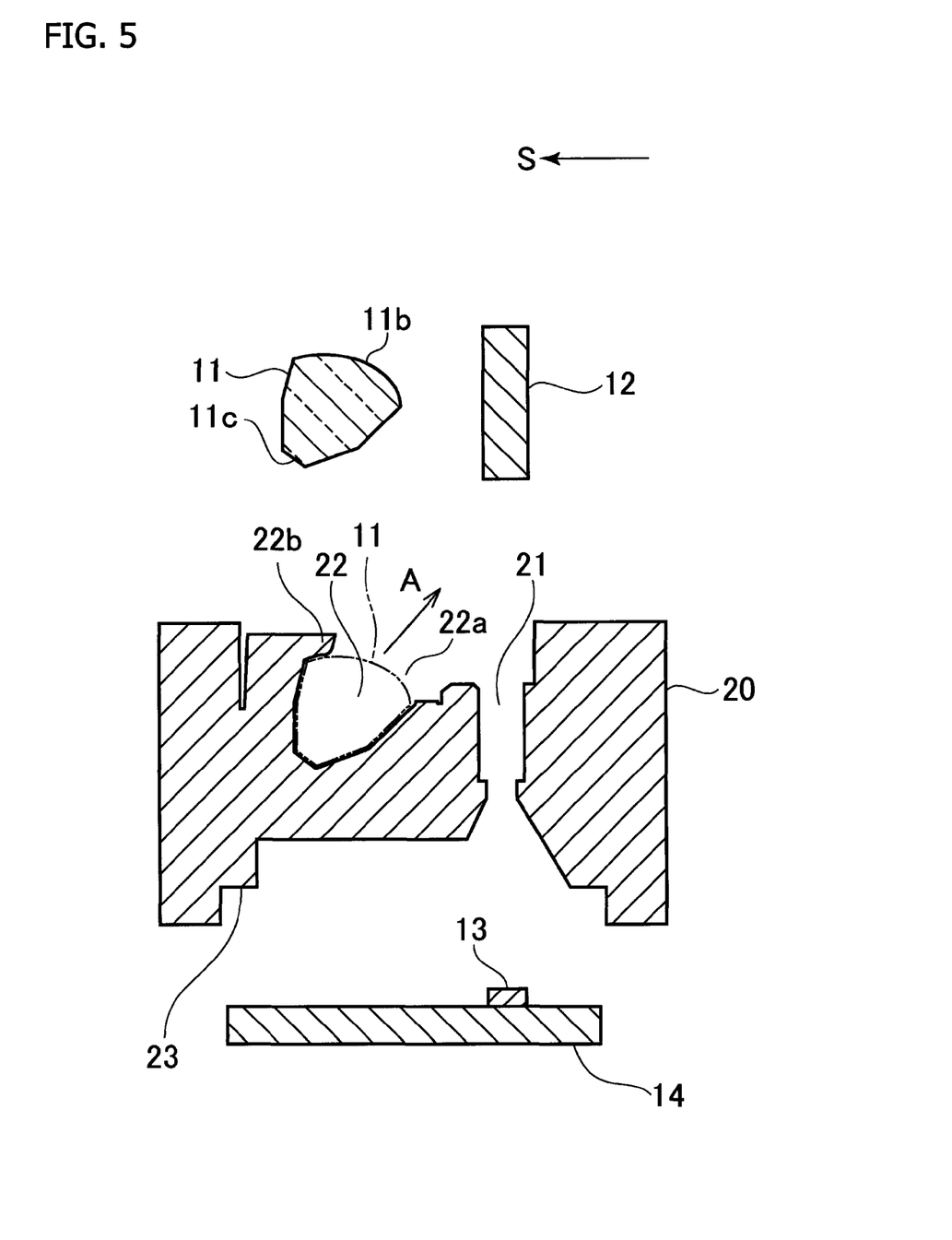
FIG. 5 is an exploded sectional view of the CIS unit 5 of this embodiment.

As shown in FIG. 5, the substrate installation part 23 is formed in a bottom peripheral part of the frame 20 into a shape cut upwardly by one stage from the bottom surface of the frame 20. The sensor substrate 14 is installed to the substrate installation part 23 from the bottom. In a state where the sensor substrate 14 is installed to the substrate installation part 23, the rod lens array 12 is disposed above the photoelectric conversion element 13 mounted on the sensor substrate 14.

As shown in FIG. 4, the light source mount 24 is formed at a position at one end of the frame 20 in the longitudinal direction and facing to the light incident surface 11a of the light guide 11 mounted in the frame 20. At the light source mount 24, a light source insertion groove 25, into which the light source 10 can be inserted from the bottom, is formed. The light source insertion groove 25 is formed so as to vertically penetrate the frame 20.

Figure 6A:
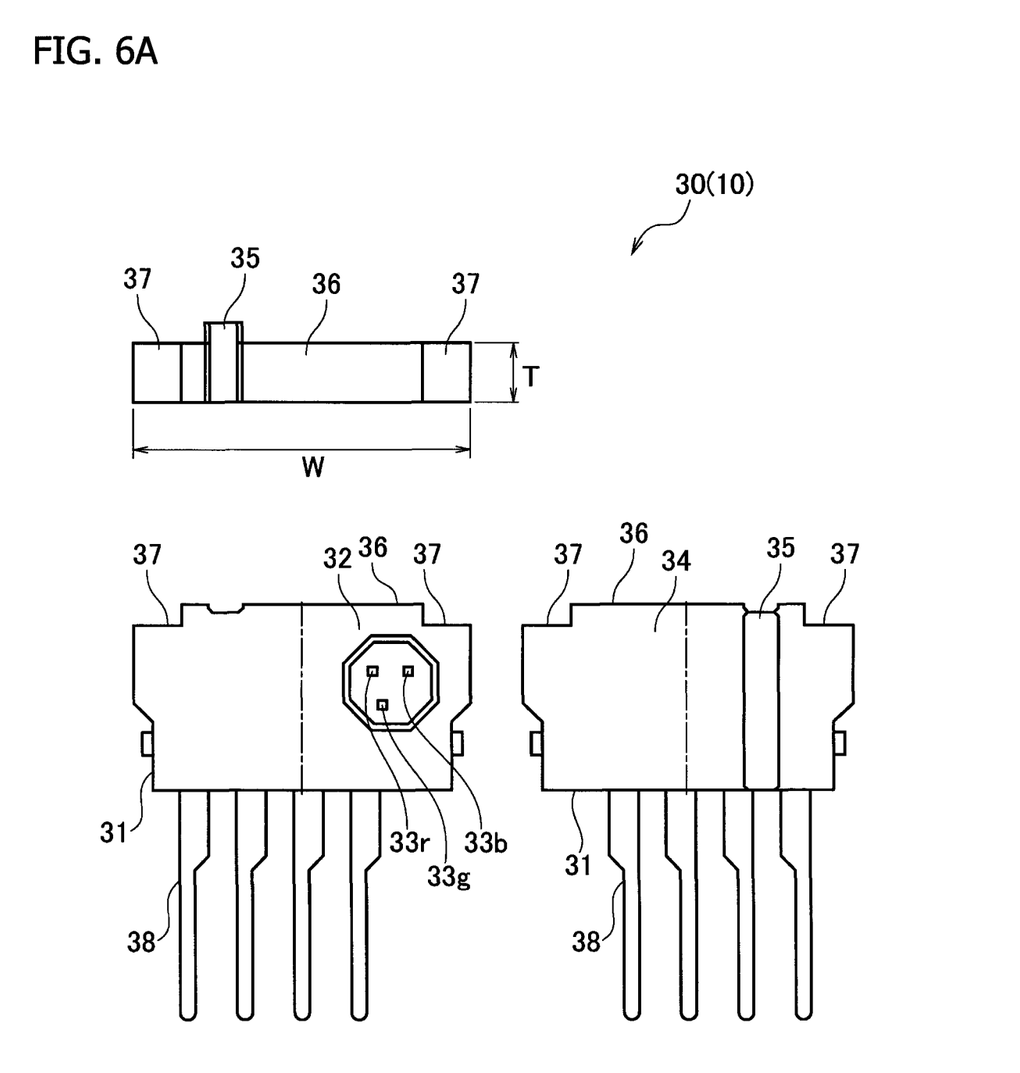
FIG. 6A is a plan view of an LED module 30 of a first embodiment.
Figure 6B:
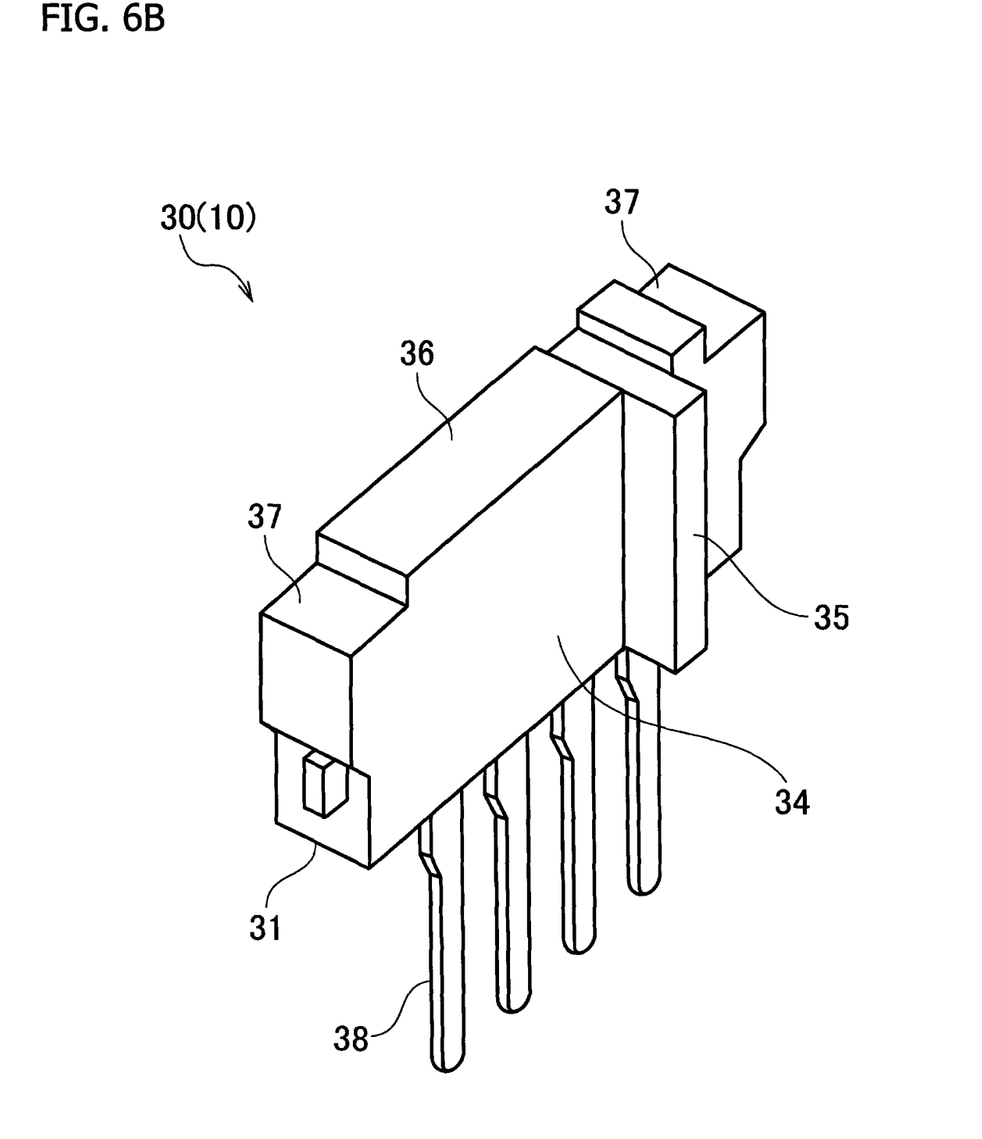
FIG. 6B is a perspective view of the LED module 30 of the first embodiment.

Here, the light source 10 to be inserted into the light source insertion groove 25 is described with reference to FIGS. 6A and 6B. FIG. 6A includes diagrams showing plan and rear elevational views and plan view of the light source. FIG. 6B shows a perspective view of the light source.

The light source 10 of this embodiment is an LED module 30 including LEDs as light emitting elements emitting red, green and blue light respectively. The LED module 30 includes a main body 31 and four lead terminals 38 protruding from the main body 31. As shown in FIG. 6A, the main body 31 is formed into a flat board shape having a width W and a thickness T.

The light emitting surface 32 of the main body 31 is formed flatly; LEDs 33r, 33g and 33b having light emitting wavelengths of three colors, or red, green and blue, are arranged thereon in a state where the surfaces are protected by, for instance, transparent resin. The LEDs 33r, 33g and 33b are disposed in a manner deviated from the center line (alternate long and short dashed line shown in FIG. 6A) of the main body 31 to one side in the width direction.

On the other hand, on a back surface 34 opposite to the light emitting surface 32 of the main body 31, a convex positioning section 35 protruding from the back surface 34 is formed linearly along the entire length of the main body 31 in the vertical direction. The positioning section 35 is formed at a position deviated from the center line of the main body 31 to the other side in the width direction. Accordingly, the LEDs 33r, 33g and 33b and the positioning section 35 are arranged on opposite sides with respect to the center line of the main body 31 and on the opposite surfaces. On both sides of a top surface 36 of the main body 31 in the width direction, insertion positioning surfaces 37, which are flat and lower than the top surface 36, are formed. As described above, the LEDs 33r, 33g and 33b and the positioning section 35 are thus disposed on the opposite side with respect to the center line. Accordingly, the main body 31 is not thick at a part on which LEDs 33r, 33g and 33b are arranged, thereby allowing heat radiation of the LEDs 33r, 33g and 33b to be improved. Note that, not limited to this case, the LEDs 33r, 33g and 33b and the convex positioning section 35 may overlap with each other in the thickness direction of the main body 31.

As shown in FIG. 4, the aforementioned light source insertion groove 25 of the frame 20 is formed into a shape into which the LED module 30 can be inserted in a state where the width direction of the LED module 30 is disposed along the sub-scanning direction. In the state where the LED module 30 is inserted into the light source insertion groove 25, the light incident surface 11a of the light guide 11 and the LEDs 33r, 33g and 33b of the LED module 30 are required to be disposed in place at positions facing to each other. Thus, in this embodiment, as shown in FIG. 4, a concave positioning section 26 corresponding to the convex positioning section 35 formed on the back surface 34 of the LED module 30 is formed in the light source insertion groove 25. That is, the concave positioning section 26 is formed on the surface of the light source insertion groove 25 facing to the back surface 34 of the LED module 30. The concave positioning section 26 is formed linearly along the entire length of the light source insertion groove 25 in the vertical direction.

In the state where the LED module 30 is inserted into the light source insertion groove 25, the convex positioning section 35 and the concave positioning section 26 position the LED module 30 with respect to the light source insertion groove 25. More specifically, the convex positioning section 35 and the concave positioning section 26 are convex and concave in a direction orthogonal to the width direction of the LED module 30. Accordingly, the LED module 30 is positioned with respect to the width direction of the light source insertion groove 25.

On both sides in the longitudinal direction and the top of the light source insertion groove 25, an insertion positioning section 27 covered with the top surface of the frame 20 is formed. The insertion positioning section 27 comes into contact with the insertion positioning surface 37 of the LED module 30 inserted into the light source insertion groove 25, thereby allowing the LED module 30 to be positioned with respect to the light source insertion groove 25 in the vertical direction.

The LED module 30 is thus arranged in place at a certain position with respect to the frame 20 by means of the convex positioning section 35 and the concave positioning section 26. The light guide 11 is held by the light guide supporting groove 22 at a certain mounting angle with respect to the frame 20. Accordingly, in the state where the LED module 30 and the light guide 11 are mounted in the frame 20, the LED module and the light guide 11 are disposed always maintaining prescribed relative positions via the frame 20. That is, the LEDs 33r, 33g and 33b of the LED module 30 can accurately be disposed at positions facing to the light incident surface 11a of the light guide 11.

Next, a method of assembling the CIS unit 5 configured as described above will be described.

First, the rod lens array 12 is inserted into the lens insertion groove 21 from above. The rod lens array 12 inserted into the lens insertion groove 21 is fixed at a prescribed position by means of adhesive applied on the lens insertion groove 21.

The light guide 11 is inserted into the light guide supporting groove 22 from above. At this time, the holding overhang 22b holds, from above, the light guide 11 inserted into the light guide supporting groove 22. As described above, the light guide supporting groove 22 has the sectional shape substantially identical to the part of the sectional shape of the light guide 11. Accordingly, in the state where the light guide 11 is held in the light guide supporting groove 22, the light guide 11 is positioned in the light guide supporting groove 22 at the prescribed mounting angle. The convex longitudinal positioning section 11d of the light guide 11 is fitted into the concave longitudinal positioning section 22c of the light guide supporting groove 22, thereby allowing the light guide 11 to be positioned with respect to the longitudinal direction of the light guide supporting groove 22.

Next, the frame 20 is turned upside down such that the substrate installation part 23 turns up. In a state where the LED module 30 is turned upside down such that the lead terminals 38 turn up and the main body 31 turns down, the LED module 30 is inserted down into the light source insertion groove 25 from above. A direction in which the LED module 30 is inserted is orthogonal to both the main and sub-scanning directions of the CIS unit 5. At this time, the LED module 30 is inserted while the convex positioning section 35 of the LED module 30 is positioned with respect to the concave positioning section 26 of the light source insertion groove 25. In this embodiment, the LED module 30 is firmly held in a wide space outside the frame 20. Accordingly, the convex positioning section 35 and the concave positioning section 26 can be easily positioned.

Insertion of the LED module 30 into the light source insertion groove 25 fits the concave positioning section 26 into the convex positioning section 35, thereby allowing the LED module 30 to be positioned with respect to the width direction of the light source insertion groove 25. That is, the concave positioning section 26 and the convex positioning section 35 are thus formed along the insertion direction in which the LED module 30 is inserted into the light source insertion groove 25; when the LED module 30 is inserted into the light source insertion groove 25, the LED module 30 is positioned with respect to the width direction of the light source insertion groove 25. The insertion positioning surface 37 of the LED module 30 comes into contact with the insertion positioning section of the frame 20, thereby allowing the LED module to be positioned with respect to the insertion direction of the light source insertion groove 25. Thus, only the operation of inserting the LED module into the light source insertion groove 25 allows the LED module 30 to be positioned. Accordingly, the LED module 30 can easily be attached. The concave positioning section 26 is formed along the entire length of the light source insertion groove 25 in the vertical direction, and the convex positioning section 35 is formed along the entire length of the main body 31 in the vertical direction. Accordingly, the concave positioning section 26 is fitted to the convex positioning section 35 over a long extent in the vertical direction. This can prevent loose fit between the LED module 30 and the light source insertion groove 25.

Next, the sensor substrate 14 is installed to the substrate installation part 23. At this time, the lead terminals 38 of the LED module 30 become in a state of penetrating respective holes 15 (see FIG. 4) provided at the sensor substrate 14. The lead terminals 38 are soldered in the respective holes 15. Protrusions, not shown, formed apart from each other on the opening periphery of the substrate installation part 23 are subsequently welded to the periphery of the sensor substrate 14 by means of heat swaging, and the assemblage of the CIS unit 5 is completed.

Figure 7:
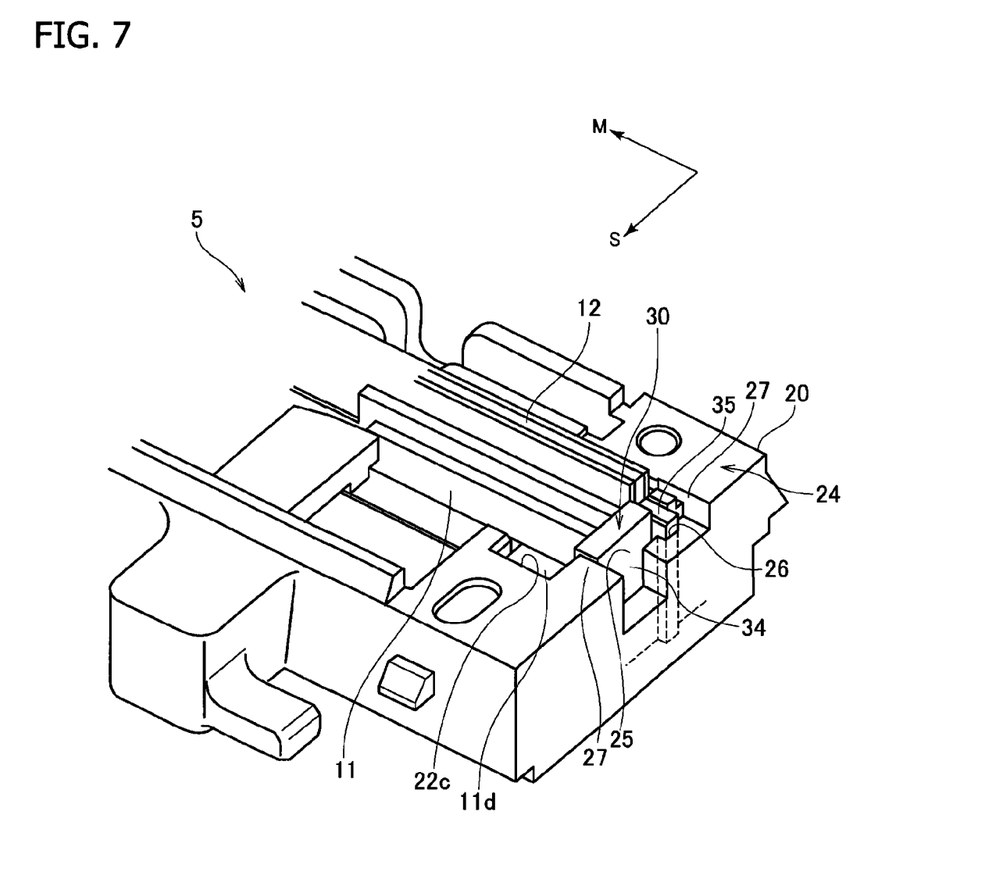
FIG. 7 is a perspective view in which the CIS unit 5 of the first embodiment is assembled.

FIG. 7 shows the CIS unit 5 in a state where the rod lens array 12, the light guide 11 and the LED module 30 are assembled to the frame 20. In the CIS unit 5 attached as shown in FIG. 7, the LED module 30 is positioned with respect to the frame 20, and the light guide 11 is also positioned with respect to the frame 20. Accordingly, the LED module 30 and the light guide 11 are disposed maintaining prescribed relative positions via the frame 20. Accordingly, the LEDs 33r, 33g and 33b of the LED module 30 can accurately be disposed at the position facing to the light incident surface 11a of the light guide 11, and the light ejecting surface 11b of the light guide 11 can eject light having a desired illumination intensity. Further, the light source insertion groove 25 is formed to penetrate the frame 20 in the vertical direction. This enables the heat radiation of the LED module 30 to be improved; even in a case of requiring replacement of the LED module 30, this allows the LED module 30 to be replaced from above by removing only the insertion positioning section 27 using a tool without detaching the welded sensor substrate 14.

By the way, in the CIS unit 5, there are cases of changing the size of the light incident surface 11a of the light guide 11 and changing the mounting angle of the light guide 11 to the frame 20 according to specifications. In these cases, it is suffice to newly prepare only a frame 20 where the sectional shape of the light guide supporting groove 22 is changed so as to match a changed light guide or a desired mounting angle. That is, in this embodiment, the LED module 30 and the light guide 11 are positioned via the frame 20. Accordingly, it is suffice to newly prepare only the frame 20 causing the LEDs 33r, 33g and 33b of the LED module 30 to be disposed at a position facing to the light incident surface 11a of the light guide 11. This negates the need to newly prepare an LED module 30 corresponding to the light guide 11, thereby allowing management and production costs to be reduced.

Second Embodiment

Figure 8A:
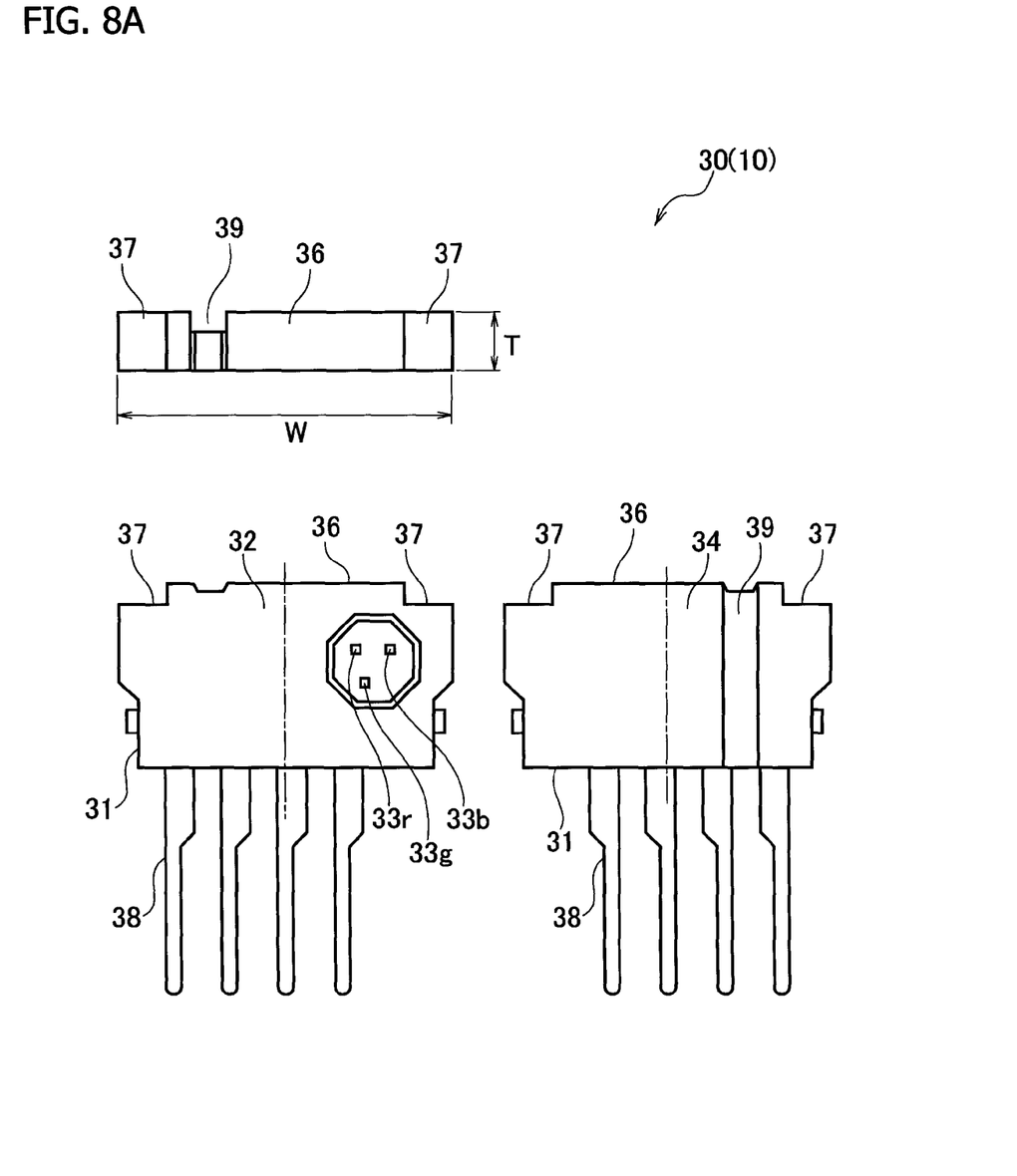
FIG. 8A is a plan view of an LED module 30 according to a second embodiment.
Figure 8B:
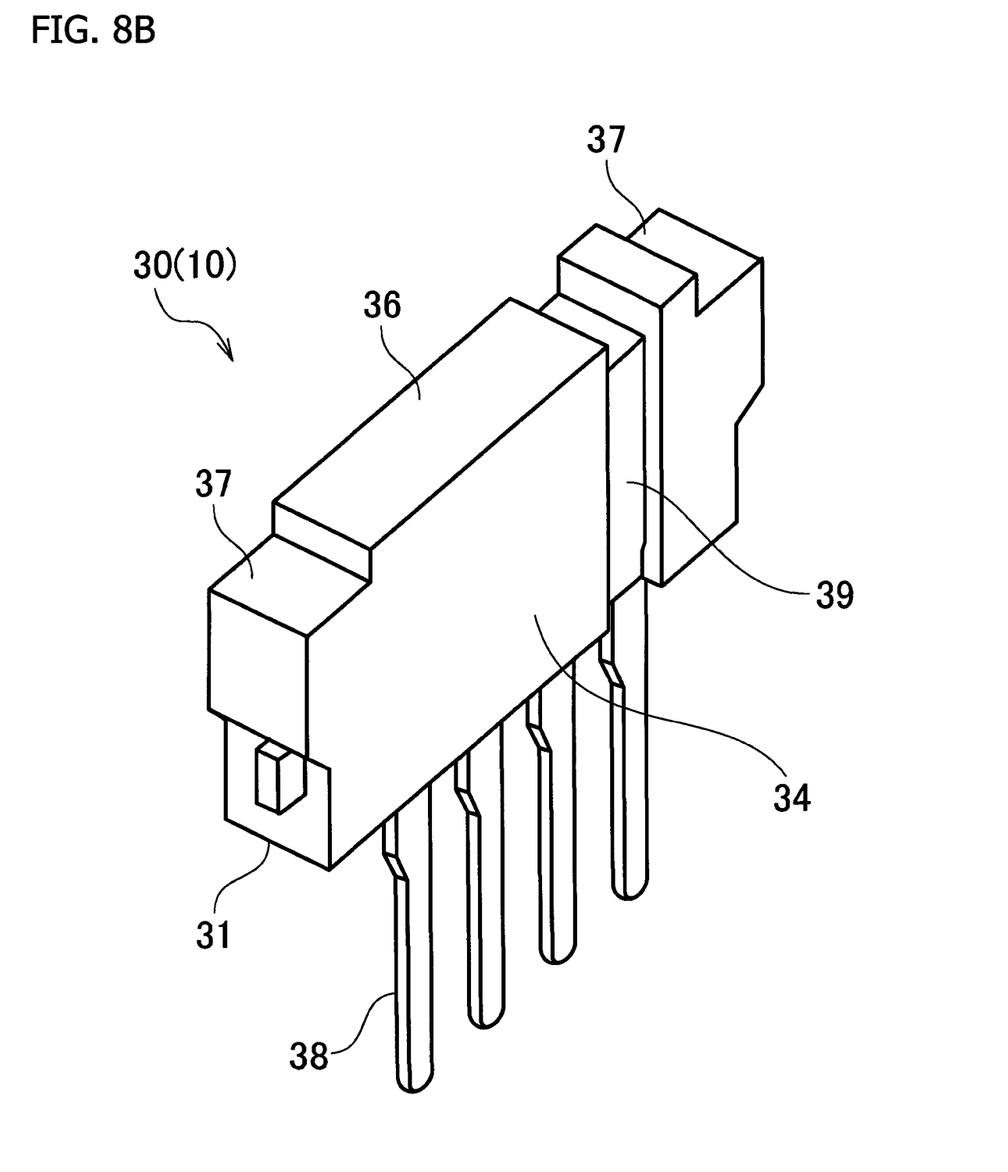
FIG. 8B is a perspective view of the LED module 30 according to the second embodiment.
Figure 9:
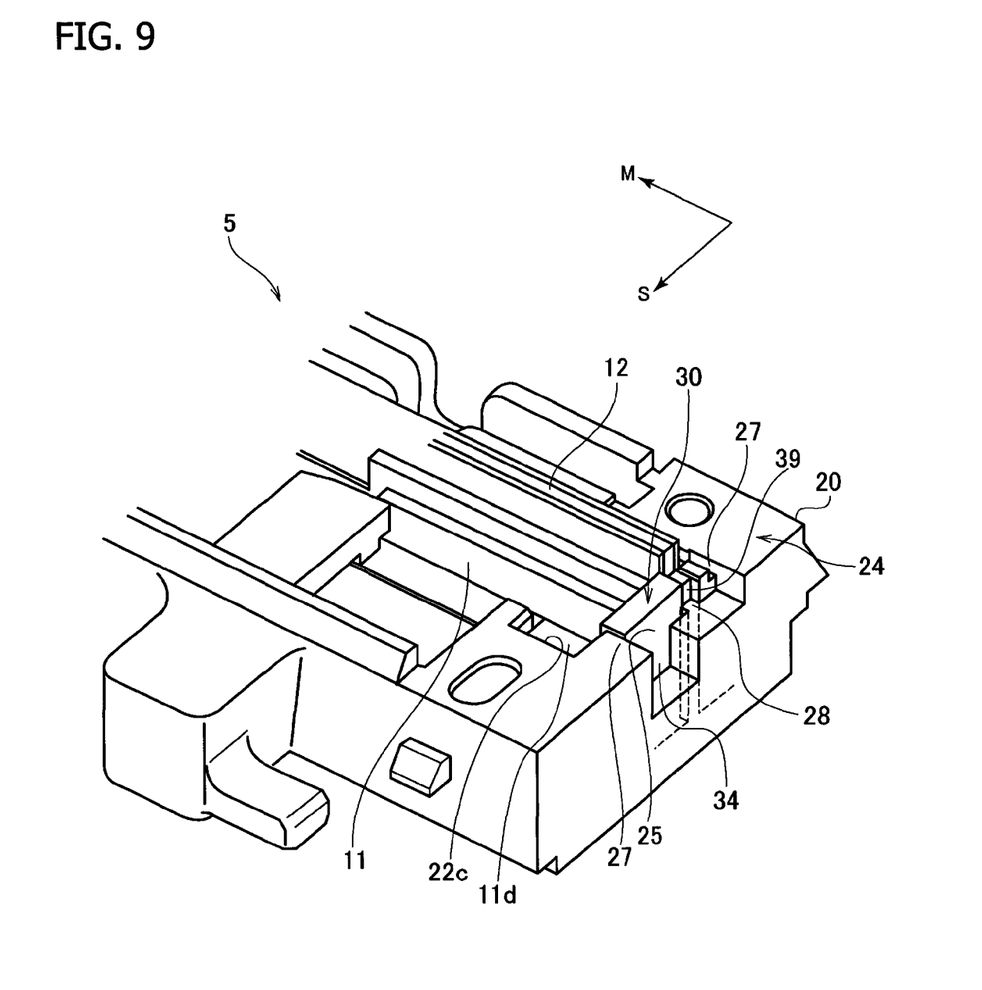
FIG. 9 is a perspective view in which the CIS unit 5 of the second embodiment is assembled.

Next, configurational elements of a CIS unit 5 of a second embodiment will be described with reference to FIGS. 8A to 9. FIG. 8A is a diagram of a light source 10 of the second embodiment. FIG. 8B is a perspective view of the light source 10 of the second embodiment. FIG. 9 is a perspective view showing a state where the CIS unit 5 of the second embodiment is assembled. In the first embodiment, the convex positioning section 35 is formed at the LED module 30, and the concave positioning section 26 is formed in the light source insertion groove 25. In the second embodiment, the convex and concave parts are reversed, and a concave positioning section 39 is formed at the LED module 30, and a convex positioning section 28 is formed at the light source insertion groove 25. Other configuration and attachment methods are analogous to those of the first embodiment. Identical symbols are assigned thereto and their description is omitted.

As shown in FIGS. 8A and 8B, in the LED module 30 of this embodiment, the concave positioning section 39 is formed linearly along the entire length of the main body 31 in the vertical direction into a shape cut by one stage from the back surface 34, on the back surface 34 opposite to the light emitting surface 32 of the main body 31.

As shown in FIG. 9, the convex positioning section 28, which corresponds to the concave positioning section 39 formed on the back surface 34 of the LED module 30, is formed in the light source insertion groove 25. The convex positioning section is formed linearly along the entire length of the light source insertion groove 25 in the vertical direction.

Accordingly, in a state where the LED module 30 is mounted on the light source insertion groove 25, the concave positioning section 39 and the convex positioning section 28 position the LED module 30 with respect to the width direction of the light source insertion groove 25. Further, in this embodiment, the concave positioning section 39 is formed on the back surface 34 of the LED module 30. Accordingly, there is a part where the main body 31 is thin. This allows the heat radiation of the LEDs 33r, 33g and 33b to be improved. The provision of the concave positioning section 39 allows the amount of use of sealing resin used for the LED module 30 is reduced, thereby allowing the manufacturing cost to be reduced. The LEDs 33r, 33g and 33b and the concave positioning section 39 may overlap in the thickness direction of the main body 31. In this case, the heat radiation of the LEDs 33r, 33g and 33b can be further improved.

The present invention has been described above along with the various embodiments. However, the present invention is not limited to these embodiments. Instead, modifications may be made in an extent of the present invention.

The image sensor unit of the present invention is effectively used as an image reading apparatus in, such as an image scanner, a facsimile and a copier.

According to the present invention, the light source can accurately be positioned with respect to the light guide and easily attached.

What is claimed is:

1. An image sensor unit comprising:
   a light source including a light emitting element on a light emitting surface;
   a light guide having a light incident surface and a light ejecting surface, the light incident surface being positioned facing the light emitting surface, wherein the light guide emits the light from the light ejecting surface and illuminates an object to be illuminated;
   an imaging element imaging reflected light from the illuminated object;
   a sensor substrate on which a photoelectric conversion element is mounted, the photoelectric conversion element converting the reflected light imaged by the imaging element into an electric signal; and
   a supporter that supports the light source, the light guide, the imaging element, and the sensor substrate,
   wherein positioning sections are provided on an opposite side of the light emitting surface of the light source and at a part of the supporter where the opposite side of the light emitting surface of the light source is positioned,
   wherein the positioning sections are formed along an insertion direction in which the light source is inserted into the supporter,
   wherein the positioning section disposed on the opposite side of the light emitting surface of the light source is formed along an entire length of the opposite side of the light emitting surface of the light source along the insertion direction, and
   wherein the positioning section provided at the supporter is formed along an entire length of the supporter along the insertion direction.

2. The image sensor unit according to claim 1, wherein the insertion direction is a direction orthogonal to a main scanning direction and a sub-scanning direction in the image sensor unit.

3. The image sensor unit according to claim 1, wherein the light emitting surface is flatly formed.

4. An image sensor unit comprising:
   a light source including a light emitting element on a light emitting surface;
   a light guide having a light incident surface and a light ejecting surface, the light incident surface being positioned facing the light emitting surface, wherein the light guide emits the light from the light ejecting surface and illuminates an object to be illuminated;
   an imaging element imaging reflected light from the illuminated object;
   a sensor substrate on which a photoelectric conversion element is mounted, the photoelectric conversion element converting the reflected light imaged by the imaging element into an electric signal; and
   a supporter that supports the light source, the light guide, the imaging element, and the sensor substrate, wherein positioning sections are provided on an opposite side of the light emitting surface of the light source and at a part of the supporter where the opposite side of the light emitting surface of the light source is positioned, wherein the positioning sections are formed along an insertion direction in which the light source is inserted into the supporter, wherein the light emitting element is disposed at a position deviated to one side in a direction orthogonal to the insertion direction on the light emitting surface of the light source, and wherein the positioning section provided on the opposite side of the light emitting surface of the light source is disposed at a position deviated to another side in the direction orthogonal to the insertion direction.

5. The image sensor unit according to claim 1, wherein longitudinal positioning sections that perform positioning in a longitudinal direction are provided at an end of the light guide on a side of the light incident surface and at a part of the supporter where the light source is positioned.

6. An image reading apparatus comprising:
an image sensor unit; and
a driving device that moves the image sensor unit,
wherein the image sensor unit comprises:
a light source including a light emitting element on a light emitting surface;
a light guide having a light incident surface and a light ejecting surface, the light incident surface being positioned facing the light emitting surface, wherein the light guide emits the light from the light ejecting surface and illuminates an object to be illuminated;

an imaging element imaging reflected light from the illuminated object;

a sensor substrate on which a photoelectric conversion element is mounted, the photoelectric conversion element converting the reflected light imaged by the imaging element into an electric signal; and a supporter that supports the light source, the light guide, the imaging element, and the sensor substrate, wherein positioning sections are provided on an opposite side of the light emitting surface of the light source and at a part of the supporter where the opposite side of the light emitting surface of the light source is positioned, wherein the positioning sections are formed along an insertion direction in which the light source is inserted into the supporter, wherein the positioning section disposed on the opposite side of the light emitting surface of the light source is formed along an entire length of the opposite side of the light emitting surface of the light source along the insertion direction, and wherein the positioning section provided at the supporter is formed along an entire length of the supporter along the insertion direction.

\* \* \* \* \*